(12) United States Patent
Kamikawa et al.

(10) Patent No.: US 10,620,389 B1
(45) Date of Patent: Apr. 14, 2020

(54) OPTICAL INSPECTION APPARATUS

(71) Applicant: KABUSHIKI KAISHA TOSHIBA, Tokyo (JP)

(72) Inventors: Takahiro Kamikawa, Tokyo (JP); Hiroshi Ohno, Tokyo (JP); Takehiro Hato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/556,303

(22) Filed: Aug. 30, 2019

(30) Foreign Application Priority Data

Jan. 30, 2019 (JP) .................................. 2019-014268

(51) Int. Cl.
*G02B 6/42* (2006.01)
*F21V 8/00* (2006.01)
*G02B 5/09* (2006.01)

(52) U.S. Cl.
CPC ......... *G02B 6/4201* (2013.01); *G02B 6/0096* (2013.01); *G02B 5/09* (2013.01)

(58) Field of Classification Search
CPC ....... G02B 6/4201; G02B 6/0096; G02B 5/09
See application file for complete search history.

(56) References Cited

U.S. PATENT DOCUMENTS

| 6,219,442 | B1 * | 4/2001 | Harper | ................... | G01N 21/93 |
| | | | | | 348/153 |
| 6,621,849 | B1 * | 9/2003 | Thro | ................ | H01S 3/094084 |
| | | | | | 372/66 |
| 2010/0027293 | A1 * | 2/2010 | Li | .......................... | G02B 6/002 |
| | | | | | 362/619 |
| 2018/0093502 | A1 | 4/2018 | Ishimaru et al. | | |

FOREIGN PATENT DOCUMENTS

| JP | 2002-328094 A | 11/2002 |
| JP | 2008-209726 A | 9/2008 |
| JP | 2010-251168 A | 11/2010 |
| JP | 2018-48895 A | 3/2018 |
| JP | 2018-58667 A | 4/2018 |
| JP | 2018-88613 A | 6/2018 |

* cited by examiner

*Primary Examiner* — Chris H Chu
(74) *Attorney, Agent, or Firm* — Finnegan, Henderson, Farabow, Garrett & Dunner, L.L.P.

(57) ABSTRACT

An optical inspection apparatus includes an imaging optical system facing an inspection target, a light guide, a plurality of light sources, and a plurality of mirror surfaces. The light guide has a plurality of corner portions and extending along an optical axis of the imaging optical system. The plurality of light sources face a first end face of the light guide at positions corresponding to the plurality of corner portions. The plurality of mirror surfaces are respectively provided on second end faces of the light guide. Each of the mirror surfaces is oblique relative to the optical axis. The mirror surfaces are configured to reflect light entered into the light guide from the light sources toward the inspection target.

11 Claims, 12 Drawing Sheets

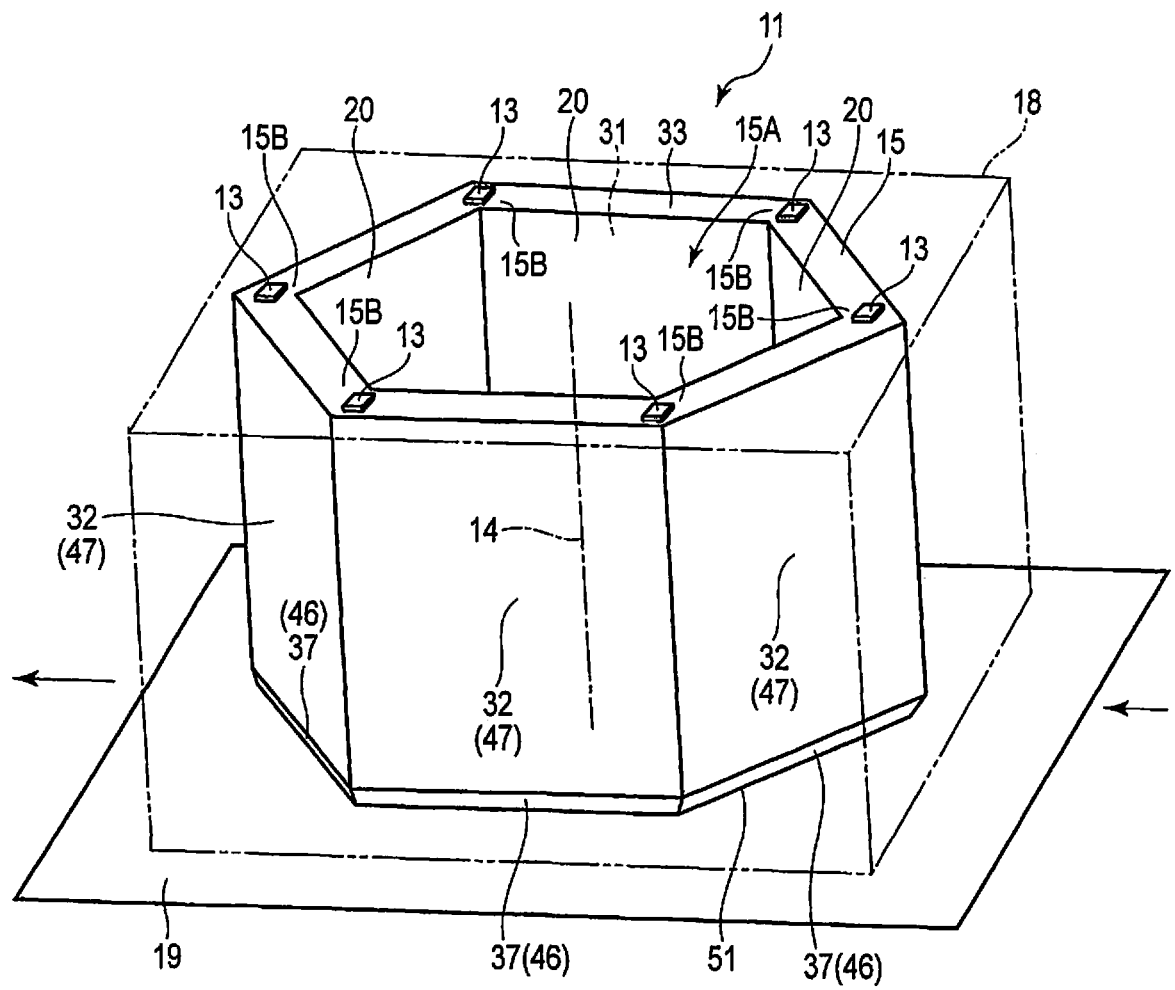
F I G. 7

US 10,620,389 B1

OPTICAL INSPECTION APPARATUS

CROSS-REFERENCE TO RELATED APPLICATIONS

This application is based upon and claims the benefit of priority from Japanese Patent Application No. 2019-014268, filed Jan. 30, 2019, the entire contents of all of which are incorporated herein by reference.

FIELD

Embodiments described herein relate generally to an optical inspection apparatus that can optically inspect the surface of an inspection target.

BACKGROUND

Some optical inspection apparatus uses a bright-field optical system that mainly uses specular reflected light components to perform image recognition of the surface shape of an inspection target. However, specular reflected light components used in the bright-field optical system tend to cause illuminance unevenness.

Illuminance unevenness causes noise in image recognition. This makes it difficult to properly identify the surface shape of an inspection target by using image recognition.

BRIEF DESCRIPTION OF THE DRAWINGS

FIG. 7 is a perspective view showing part of an optical inspection apparatus according to a third embodiment;

DETAILED DESCRIPTION

Figure 1:
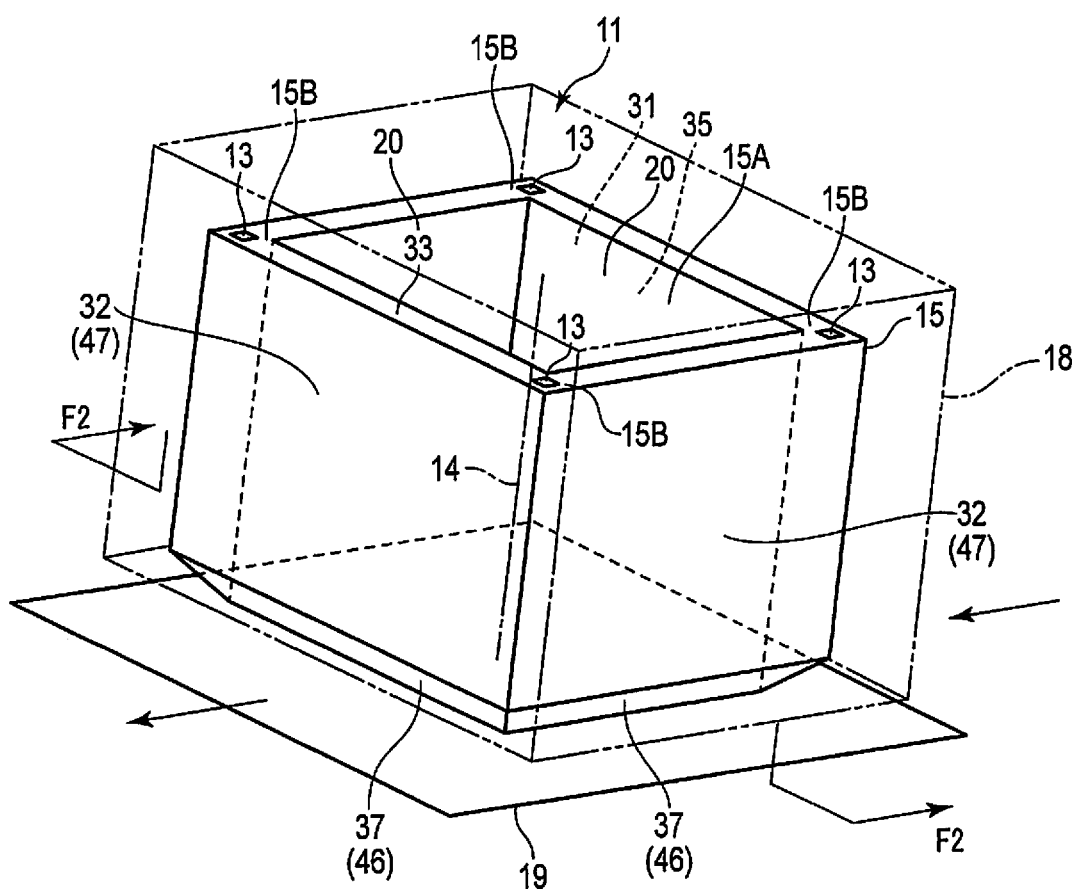
FIG. 1 is a perspective view showing part of an optical inspection apparatus according to a first embodiment.

According to one embodiment, an optical inspection apparatus includes an imaging optical system facing an inspection target, a light guide, a plurality of light sources, and a plurality of mirror surfaces. The light guide has a polygonal cylindrical shape with a plurality of corner portions extending along an optical axis of the imaging optical system. The light guide includes a first end face and a plurality of second end faces. Each of the second end faces faces the first end face. The plurality of light sources face the first end face of the light guide at positions corresponding to the plurality of corner portions. The plurality of mirror surfaces are respectively provided on the second end faces of the light guide. Each of the mirror surfaces is oblique relative to the optical axis. The plurality of mirror surfaces are configured to reflect light entered into the light guide from the light sources through the first end face toward the inspection target.

An optical inspection apparatus according to each of the embodiments will be described below with reference to the accompanying drawings. The optical inspection apparatus can inspect, for example, the shape of the surface of an inspection target in detail. In the following embodiments, the optical inspection apparatus inspects the authentication or surface shape of an article (a metal object or a piece of paper) having an exchangeable value, the presence or absence of defects (for example, cracks) in products on a production line of a factory, and the like. The optical inspection apparatus can also be used to perform other types of inspections.

An object of the present embodiments is to provide an optical inspection apparatus that can perform accurate inspection and can reduce the number of light sources.

The drawings are schematic or conceptual. The relationship in thickness and width among the components, the size ratios among the components, and the like in the drawings are not always the same as the actual ones. Even though the components shown in the drawings are the same, their dimensions and ratios may vary from drawing to, drawing. Throughout the specification and drawings, the same components are denoted by the same reference numerals and their overlapping descriptions may be omitted as appropriate.

First Embodiment

Figure 2:
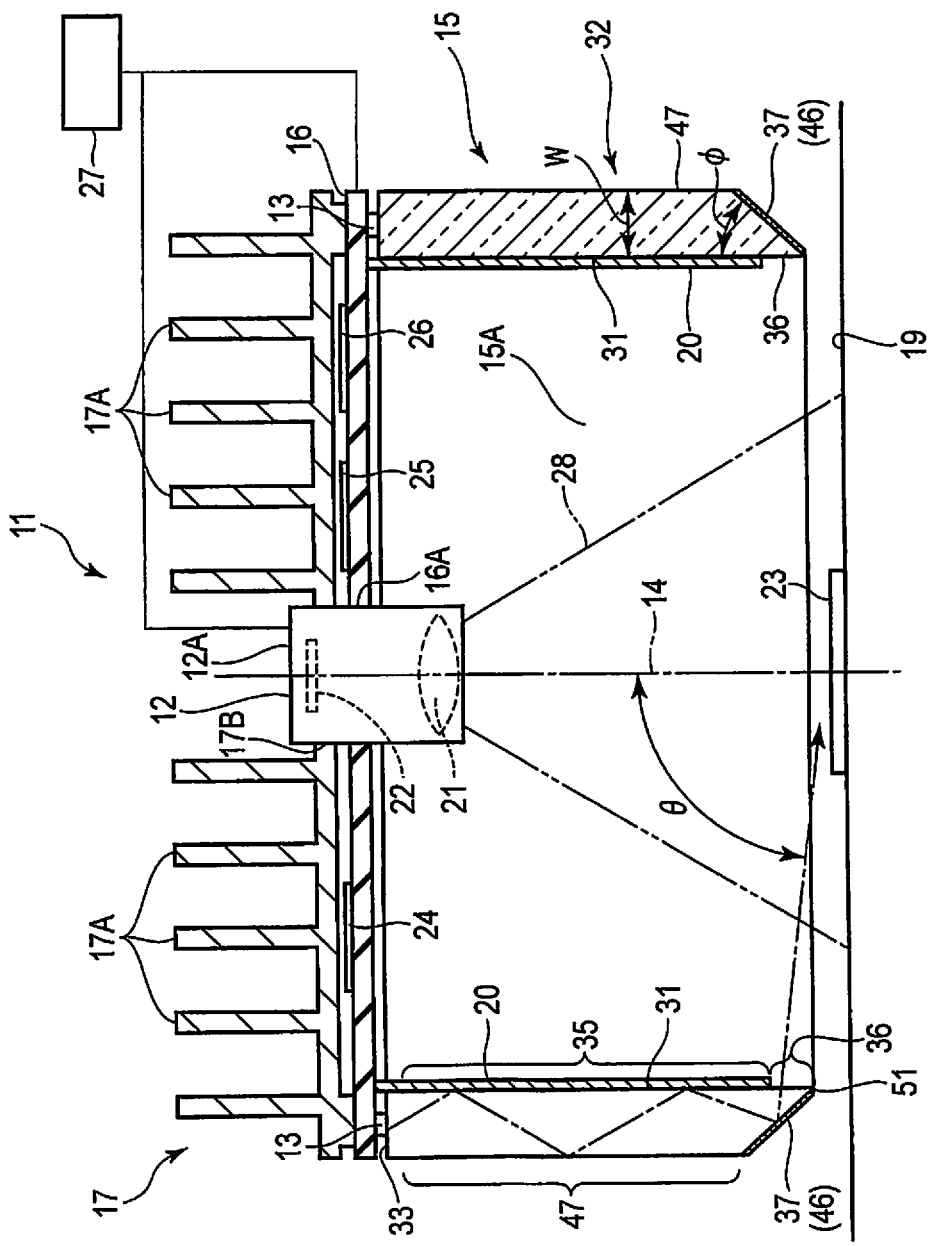
FIG. 2 is a sectional view of the optical inspection apparatus shown in FIG. 1 taken along line F2-F2 (a plane including an optical axis 14)

FIG. 1 is a perspective view showing an optical inspection apparatus 11 according to the first embodiment. FIG. 2 is a sectional view of the optical inspection apparatus 11 shown in FIG. 1, taken along a plane (the position of line F2-F2) including an optical axis 14 of the optical inspection apparatus 11. As shown in FIGS. 1 and 2, the optical inspection apparatus 11 includes an imaging optical system 12 facing an inspection target 23, a plurality of light sources 13 provided around the imaging optical system 12, a polygonal cylindrical light guide 15 provided along the optical axis 14 of the imaging optical system 12, a substrate 16 on which the plurality of light sources 13 are mounted, a heat sink 17 attached to the substrate 16, a cover 18 covering around the light guide 15, a convey path 19 along which the inspection target 23 is fed, and light-shielding plates 20 covering inner surfaces 31 of the light guide 15.

The cover 18 is fixed to, for example, a gate-shaped machine stand or frame (not shown) of the optical inspection apparatus 11 and suspended from above relative to the convey path 19. The imaging optical system 12, the light guide 15, the substrate 16, the heat sink 17, and the light-shielding plates 20 are fixed to the cover 18. The convey path 19 is formed from, for example, a belt conveyor that travels in the direction indicated by arrows in FIG. 1. The inspection target 23 is fed on the convey path 19 at a predetermined speed. Accordingly, a gap having a predetermined size is provided between the convey path 19 and the light guide 15 (cover 18). Note that the direction in which the belt conveyor travels is not limited to the direction shown in FIG. 1. That is, the light guide 15 has a frame shape having a rectangular section as described later. Referring to FIG. 1, the belt conveyor travels in a direction orthogonal to a plane forming a long side of the rectangular light guide 15. However, obviously, the belt conveyor may travel in a direction parallel to the plane forming the long side of the light guide 15.

In this embodiment, the plurality of light sources 13 are, for example, four light sources arranged at four corner portions 15B of the light guide 15. However, the number of light sources 13 is not limited to four. The number of light sources 13 is preferably equal to the number of corner portions 15B of the light guide 15 and can be changed, as needed, in accordance with the number of the corner portions 15B of the light guide 15. Each of the light sources 13 is formed from, for example, an LED (Light Emitting Diode) chip itself and includes no resin lens portions surrounding the LED chip.

The plurality of light sources 13 are provided at intervals. The plurality of light sources 13 are arranged around the imaging optical system 12. The plurality of light sources 13 face an end face (first end face) 33 of the light guide 15 at positions corresponding to the corner portions 15B of the light guide 15. The plurality of light sources 13 are arranged at almost equal intervals at rotationally symmetric positions with reference to the optical axis 14. More specifically, the plurality of light sources 13 are arranged at four rotationally symmetric positions. In this case, rotational symmetry means that when an object is rotated about a rotationally symmetric axis through an angle of less than 360°, the object looks the same.

The plurality of light sources 13 are formed from, for example, white LED chips. Light emitted from each light source 13 is not limited to visible light and may be infrared light or ultraviolet light. Light emitted from the plurality of light sources 13 may be visible light other than white light. Alternatively, the plurality of light sources 13 may emit visible light of different colors. As shown in FIG. 2, the plurality of light sources 13 are provided around the imaging optical system 12.

The imaging optical system 12 may be configured by a commonly-used digital camera. As shown in FIG. 2, the imaging optical system 12 includes a lens 21 that composes a pupil plane and an image sensor 22 (CCD or CMOS). The imaging optical system 12 can capture a still image of the inspection target 23 and may also capture a moving image of the inspection target 23. The optical axis 14 (main optical axis) is defined by the lens 21 and the image sensor 22. The imaging optical system 12 may be provided such that an outer lens case 12A is in contact with the heat sink 17. This makes it possible to release the heat generated by the imaging optical system 12 to the heat sink 17.

As shown in FIG. 2, the heat sink 17 is formed of copper, an aluminum alloy, or the like, which is metal having high thermal conductivity. The heat sink 17 includes a plurality of heat dissipation fins 17A. The heat sink 17 may thermally be connected to the light sources 13 through, for example, a structure (a pad, a through hole, and the like) of a conductive metal (for example, copper) on the substrate 16 or thermally be connected directly to the light sources 13. The heat sink 17 may include, for example, an opening 17B, and the imaging optical system 12 may be inserted inside the opening 17B. The heat sink 17 may be provided outside the cover 18 or integrally with the cover 18.

The substrate 16 is formed from a commonly-used printed circuit board. A control circuit 24, an image processing circuit 25 (image processing chip), the light sources 13, a storage device 26 for image recording are mounted on the substrate 16. As shown in FIG. 2, the substrate 16 and the imaging optical system 12 receive power from a power supply 27. The control circuit 24 is electrically connected to the light sources 13 to allow the light sources 13 to be turned on and turned off individually. The control circuit 24 can be implemented by a CPU, a ROM, a RAM, and the like. The CPU can be replaced with an ASIC (Application Specific Integrated Circuit), a PLD (Programmable Logic Device), or an FPGA (Field Programmable Gate Array). Alternatively, the control circuit 24 may be implemented by a one-chip microcomputer or the like.

As shown in FIG. 2, the substrate 16 includes a through-hole portion 16A. The imaging optical system 12 passes through the through-hole portion 16A and is fixed to the cover 18. In this embodiment, therefore, the one or more light sources 13, the substrate 16, the imaging optical system 12, and the heat sink 17 are fixed to the cover 18 so as to be integrated. It is thus easy to handle the substrate 16, the one or more light sources 13, the imaging optical system 12, and the heat sink 17 when the optical inspection apparatus 11 is taken apart for maintenance.

The imaging optical system 12 is electrically connected to the control circuit 24 and the image processing circuit 25. The control circuit 24 can control the image processing circuit 25 to process the image captured by the imaging optical system 12 and display the processed image on a display unit such as a display (not shown). The control circuit 24 can also store the image processed by the image processing circuit 25 in the storage device 26 if necessary. Alternatively, the control circuit 24 may transmit image information to another personal computer, or the like via a communication cable, a wireless LAN, or the like. The storage device 26 is configured by a storage device of a semiconductor memory system, such as an SSD (Solid State Drive) and may, of course, be another storage device such as an HDD (Hard Disk Drive).

The cover 18 has a rectangular box shape surrounding the periphery (the upper surface side and the side surface side) of the light guide 15 and having an opening portion on the lower side (alongside the convey path 19). The cover 18 is integrally formed by, for example, bending a metal plate or the like into a box shape. The cover 18 can protect the light guide 15 and the like arranged inside by covering them and exhibit a light-shielding effect so as to prevent external light from entering the light guide.

The light guide 15 is formed from a material having translucency so as to have duct-like shape, that is, a cylindrical shape having a quadrilateral section (rectangular section). Although the light guide 15 looks like a rectangular frame-like shape when viewed from a distal point on the optical axis 14, the light guide 15 may be formed into a so-called square frame-like shape. The light guide 15 has a plurality of (four) corner portions 15B. The central axis of the light guide 15 coincides with the optical axis 14 of the imaging optical system 12. The light guide 15 internally has a large hollow region 15A. Accordingly, the inner surfaces 31 of the light guide 15 is configured not to enter a visual field range 28 of the imaging optical system 12. In this embodiment, this ensures a wide viewing angle for the imaging optical system 12. The optical axis 14 of the imaging optical system 12 extends through the hollow region 15A inside the light guide 15. In the embodiment, forming the light guide 15 into a square cylindrical shape makes it possible to freely change the height of the light guide 15.

The shape of the light guide 15 is not limited to an oblong or square shape and may have a quadrangular shape having sides with different lengths, such as a parallelogram.

The light guide 15 may be made of any material that is transparent to light. For example, a translucent resin material (optical material) such as an acrylic resin can be suitably used for the light guide 15, but the material of the light guide 15 is not limited to this. The material of the light guide 15 may be an optical material such as polycarbonate or glass. The light guide 15 can be formed by injection molding or mechanical work (cutting work using an NC machine tool). Alternatively, mechanical work may be performed on end portions of the light guide 15 formed into a cylindrical shape by injection molding to form mirror surfaces 37.

As shown in FIGS. 1 and 2, the light guide 15 includes the inner surfaces 31 (inner peripheral surfaces), outer surfaces 32 (outer peripheral surfaces), the first end face 33 (incident surface) alongside the imaging optical system 12, and chamfers 46 (second end faces) facing the first end face 33. In the embodiment, the number of inner surfaces 31, the number of outer surfaces 32, and the number of chamfers (mirror placement surfaces) 46 are four each. A flat total reflecting surfaces 35 is provided on each of the inner surfaces 31. A flat transmission surface 36 is provided on each of the inner surfaces 31. The inner surface 31 and the outer surface 32 are parallel and face in opposite directions to each other. The inner surface 31 is close to the main optical axis 14 and the outer surface 32 is far from the main optical axis 14 with respect to the inner surface 31. In this embodiment, a thickness W between the inner surface 31 and the outer surface 32 of the light guide 15 is maintained constant between the first total reflecting surface 35 and a second total reflecting surface 47 to be described later. The transmission surface 36 faces the mirror surface 37 at the inner surface 31 of the light guide 15.

The first total reflecting surfaces 35 and the transmission surfaces 36 of the inner surfaces 31 are transparent. The total reflecting surfaces 35 is provided closer to the light sources 13 with respect to the transmission surfaces 36. The first total reflecting surfaces 35 and the transmission surfaces 36 of the inner surfaces 31 are smoothed by surface treatment such as buffing. The first total reflecting surfaces 35 can totally internally reflect the light that has been entered into the light guide 15 from the first end face 33. The transmission surfaces 36 transmit the light reflected by the mirror surfaces 37 toward the inspection target 23. At that time, the transmission surfaces 36 refract the light transmitted through the transmission surfaces 36. In this embodiment, the first flat total reflecting surface 35 and the transmission surface 36 are continuously formed without any distinct boundary between them.

Each of the outer surfaces 32 of the light guide 15 include the flat second total reflecting surface 47 provided alongside the light sources 13 (alongside the imaging optical system 12) and a mirror surface 37 provided alongside the inspection target 23. The second total reflecting surfaces 47 are transparent. The second total reflecting surfaces 47 can totally internally reflect the light that has been entered into the light guide 15 from the light sources 13. The second total reflecting surfaces 47 and the mirror surfaces 37 of the outer surfaces 32 are smoothed by surface treatment such as buffing.

Figure 3:
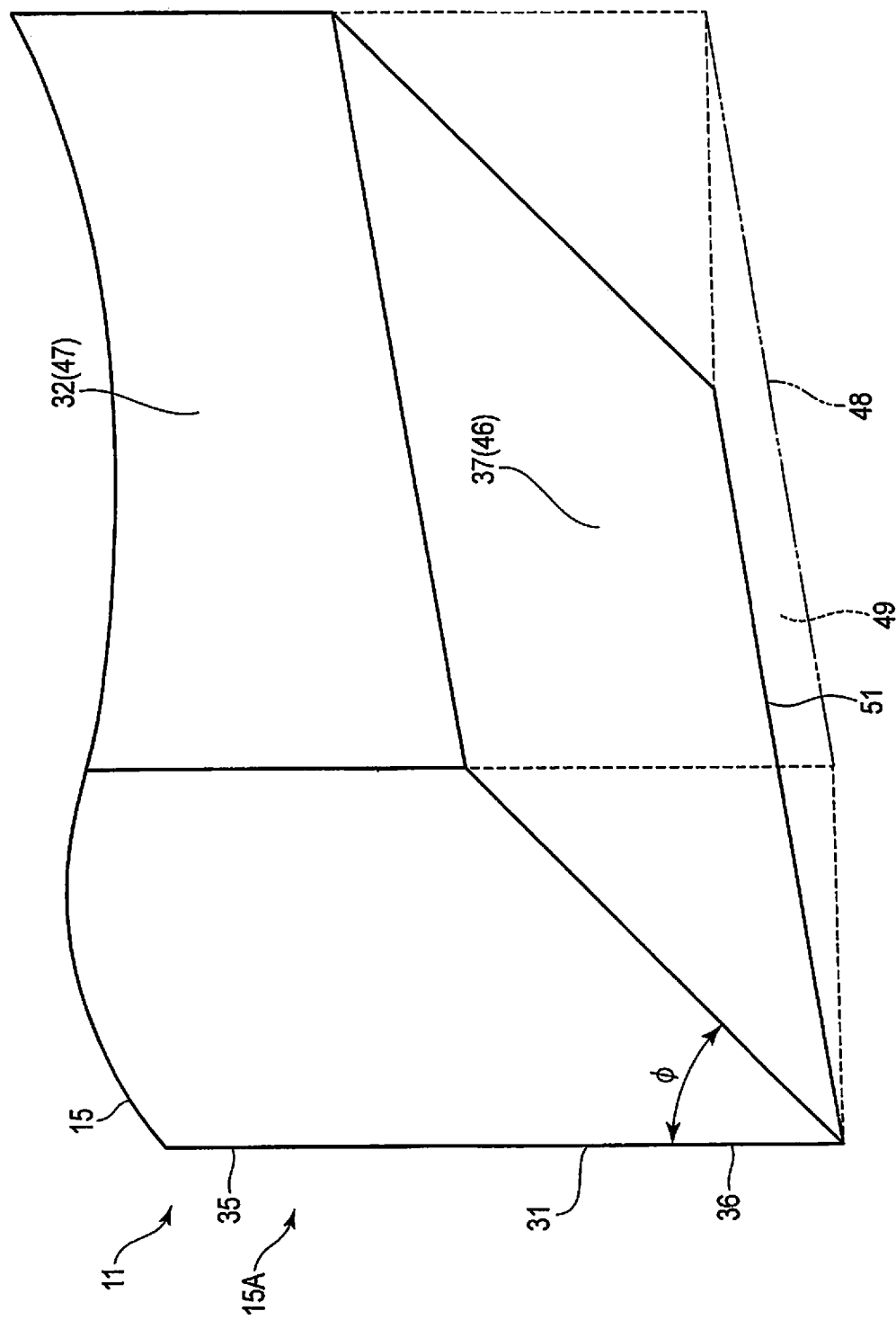
FIG. 3 is an enlarged perspective view showing the relationship between an inner surface (transmission surface), a mirror surface (chamfer), an end portion alongside an inspection target, and imaginary ridge lines of a light guide of the optical inspection apparatus shown in FIG. 2.

The mirror surface 37 is provided on the chamfer 46 provided on the outer side of the end portion of the light guide 15 which is located alongside the inspection target 23. That is, as shown in FIG. 3, the mirror surface 37 is formed from the chamfer 46 formed by chamfering so as to remove an imaginary ridge line 48 located at the intersection position between an end portion 49 of the light guide 15 which is located alongside the inspection target 23 and the outer surface 32 of the light guide 15. The chamfer 46 can also be regarded as a second end face facing the first end face 33 alongside the imaging optical system 12.

An angle $\phi$ formed by the mirror surface 37 (chamfer 46) and the optical axis 14 (or the inner surface 31 or the transmission surface 36) is, for example, 30° to 70°, preferably 35° to 65°, more preferably 40° to 60°. These shapes can be regarded as those obtained by providing a distal end portion of the light guide 15 with a taper angle of 30° to 70°, preferably 35° to 65°, more preferably 40° to 60°.

The mirror surfaces 37 can reflect light entered into the light guide 15 from the light sources 13 toward the inspection target 23. The mirror surfaces 37 have been mirrored by depositing aluminum or the like on the chamfers 46 of the outer surfaces 32. The method of forming the mirror surfaces 37 is not limited to this. For example, another member including the mirror surfaces 37 is brought into tight contact with the outer surfaces 32 so as to cause reflection at the chamfers 46 of the outer surfaces 32.

In this embodiment, each mirror surface 37 is inclined so as to approach the inner surface 31 with an increase in distance from the first end face 33. At the position where the mirror surface 37 is provided, the thickness between the inner and outer surfaces 31 and 32 of the light guide 15 decreases with an increase in distance from the imaging optical system 12 (first end face 33).

The irradiation field (the convey path 19 and the inspection target 23) that is irradiated with light from the light guide 15 is located at a position, for example, 5 mm away from the boundary portion (an edge portion 51) between the mirror surface 37 and the inner surface 31, which is located at a distal end of the light guide 15. However, the position of the irradiation field is not limited to this example.

The light-shielding plate 20 is provided in tight contact with the total reflecting surface 35 of the inner surface 31 of the light guide 15. That is, the four light-shielding plate 20 covers the four inner surface 31 of the light guide 15 at a position out of the four transmission surface 36. Accordingly, the four light-shielding plates 20 are provided in a rectangular cylindrical shape so as to partially cover the four inner surfaces 31 of the light guide 15. The upper end portions of the light-shielding plates 20 are in contact with the substrate 16 so as to prevent light from the light sources 13 from directly leaking into the hollow region 15A through the gap between the substrate 16 and the light-shielding plates 20. The light-shielding plates 20 are, for example, bonded to the total reflecting surfaces 35 of the light guide 15 and fixed to the cover 18 through the light guide 15. The method of fixing the light-shielding plates 20 to the light guide 15 is not limited to this. The light-shielding plates 20 may be fixed to the substrate 16.

The light-shielding plate 20 is formed from, for example, a black paper sheet. However, the material of the light-shielding plate 20 is not limited to this. The light-shielding plates 20 may be formed from any material having any color as long as it exhibits a light-shielding effect. Accordingly, the light-shielding plates 20 may be formed from a plastic plate and may be formed to have an arbitrary color other than black as long as it secures a light-shielding effect.

The function of the optical inspection apparatus 11 according to this embodiment will be described next with reference to FIGS. 1 and 2 and the like.

Light entering the light guide 15 from the plurality of light sources 13 through the end face 33 is diffused around the central axis (the optical axis 14 of the imaging optical system 12) by the light guide 15. This light is internally totally reflected by the total reflecting surfaces 35 and also internally totally reflected by the second total reflecting surfaces 47. The light may be totally internally reflected by these surfaces a plurality of times. The light internally totally reflected by the total reflecting surfaces 35 reaches the mirror surfaces 37 and is reflected by the mirror surfaces 37 toward the inspection target 23. The light reflected by the mirror surfaces 37 is refracted and transmitted through the transmission surfaces 36 to obliquely enter the inspection target 23. An incident angle θ of light entering the surface of the inspection target 23 is, for example, 50° to 89° (−50° to)−89°, preferably 55° to 85° (−55° to)−85°, more preferably 60° to 80° (−60° to)−80°.

Figure 4:
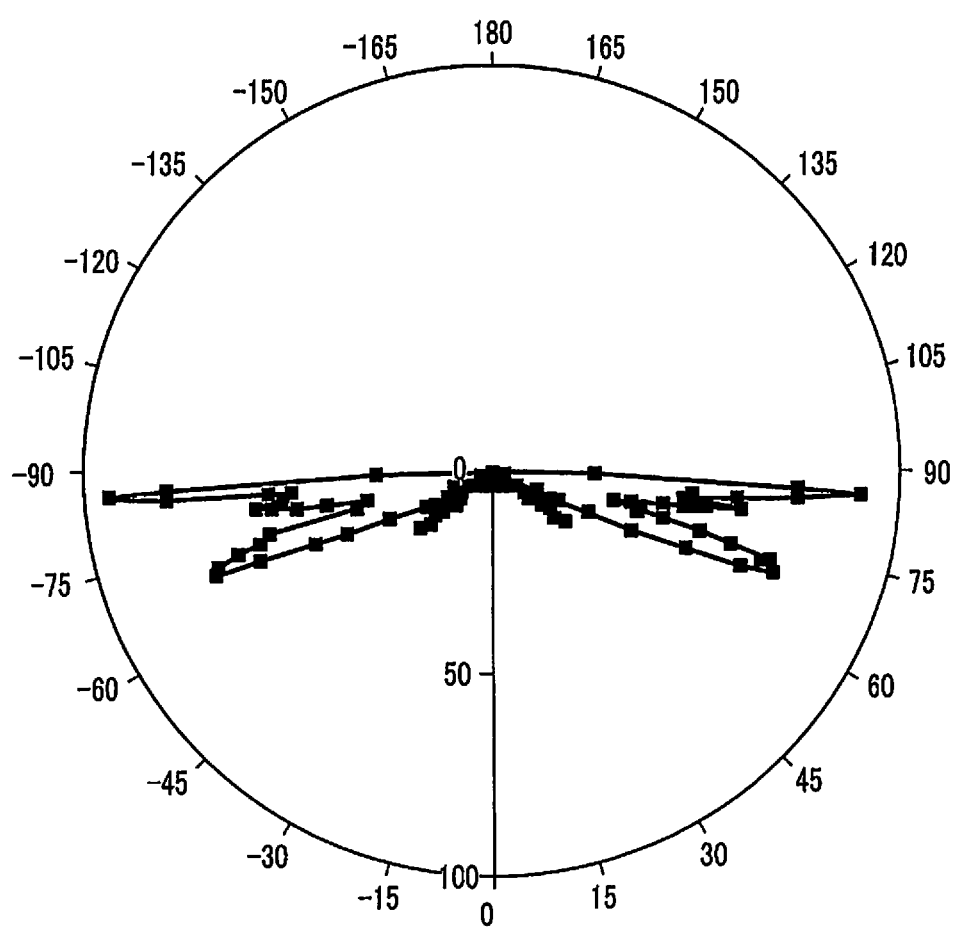
FIG. 4 is a view showing a light distribution (incident angle distribution) at an azimuth angle of 30° based on the light tracking simulation result of light beams emitted from light sources in the optical inspection apparatus shown in FIG. 1 when an angle φ formed by a mirror surface (chamfer) and an optical axis (inner surface) is set to 50°.

FIG. 4 shows a light distribution (an incident angle distribution on the surface of the inspection target 23) calculated by using light tracking simulation. The simulation result shown in FIG. 4 indicates that the incident angle θ of light entering the surface of the inspection target 23 was actually distributed in the range of 60° to 80° (−60° to)−80°. This tendency did not greatly change regardless of azimuth angles of observation centered on the inspection target 23. The light distribution (incident angle distribution) simulation result was obtained at azimuth angles of 0°, 30°, 45°, 60°, 90°, 120°, 135°, and 150° viewed from the optical axis 14. Note that FIG. 4 corresponds to the simulation result of a light distribution (incident angle distribution) at an azimuth angle of 30° when the angle ϕ formed by the mirror surface 37 (chamfer 46) and the optical axis 14 (inner surface 31) is set to 50°.

This simulation result indicates that the angle width of incident angles was about 20°. This enables to understand that this embodiment implemented a sufficiently narrow light distribution. This minimizes the occurrence of specular reflected light components as noise. The imaging optical system 12 can obtain an image of the inspection target 23 by irradiating the inspection target 23 with light in this manner and detecting light (scattered light) reflected by the inspection target 23. In this case, the incident angle of light on the surface of the inspection target 23 falls within the range of 60° to 80° (−60° to −80°), and the inspection target 23 can be irradiated with narrowly distributed and obliquely incident light. This makes it possible to extract a large amount of obliquely incident light that is effective as inspection light while minimizing specular reflected light components as noise. This implements accurate inspection of the edges of the surface shape of the inspection target 23. With the minimum number of light sources 13, it is also possible to obtain light with sufficient intensity.

This embodiment can gather heat sources in one place by gathering the light source 13, the imaging optical system 12, and the substrate 16. This makes it possible to cool these heat sources by using the heat sink 17 and the like. In addition, gathering the heat sources at a position away from an inspection target can prevent the inspection target from being adversely affected by heat.

The optical inspection apparatus 11 according to this embodiment can be, for example, suitably used for the inspection of an article having an exchangeable value as the inspection target 23. The optical inspection apparatus 11 can be used to, for example, inspect the authentication and surface shape of an article having an exchangeable value by properly inspecting the uneven shape of the article having the exchangeable value.

The first embodiment has the following effects.

The optical inspection apparatus 11 includes the imaging optical system 12 facing the inspection target 23, the light guide 15 having a polygonal cylindrical shape extending along the optical axis 14 of the imaging optical system 12 and having the plurality of corner portions 15B, the plurality of light sources 13 facing the end face 33 of the light guide 15 at positions corresponding to the plurality of corner portions 15B, and the mirror surfaces 37 that are provided on the second end faces 46 facing the end face 33 of the light guide 15 obliquely with respect to the optical axis 14 and can reflect light entered into the light guide 15 from the light sources 13 toward the inspection target 23.

According to this arrangement, because the light sources 13 are arranged at positions corresponding to the corner portions 15B, it is possible to reduce the manufacturing cost of the optical inspection apparatus 11 while minimizing the number of light sources 13. It is also possible to minimize the heat generated by the light sources 13. In addition, because the light sources 13 are arranged at positions corresponding to the corner portions 15B of the light guide 15 and the mirror surfaces 37 are provided on the second end faces 46 near the inspection target 23, the inspection target 23 can be irradiated with narrowly distributed and obliquely incident light. This makes it possible to implement accurate inspection of the surface of the inspection target 23 while preventing the inspection target 23 from being irradiated with specular reflected light components as noise.

According to the first embodiment, the optical inspection apparatus 11 that can perform accurate inspection and can reduce the number of light sources 13 is provided.

In this case, each mirror surface 37 obliquely approaches the inner surface 31 of the light guide 15 with an increase in distance from the end face 33. This arrangement makes it possible to implement each mirror surface 37 that can reflect light entered into the light guide 15 toward the inspection target 23 with a very simple shape. This makes it possible to reduce a manufacturing cost and the cost required to manufacture the optical inspection apparatus 11.

In this case, this arrangement includes the transmission surfaces 36 provided at positions facing the mirror surfaces 37 on the inner surfaces 31 of the light guide 15 and the light-shielding plates 20 covering the inner surfaces of the light guide 15 at positions out of the transmission surfaces 36. According to this arrangement, light entering the light guide 15 is transmitted through portions of the inner surfaces 31 except for the transmission surfaces 36 so as to travel to the inspection target 23 side, thereby preventing the inspection target 23 from being irradiated with specular reflected light components as noise. This can perform more accurate inspection of the surface of the inspection target 23.

Each mirror surface 37 is formed from the chamfer 46 formed by chamfering so as to remove the imaginary ridge line 48 located at the intersection position between the end portion 49 of the light guide 15 which is located alongside the inspection target 23 and the outer surface 32 of the light guide 15. This arrangement can irradiate the inspection target 23 with obliquely incident and narrowly distributed light with a very simple structure.

The angle φ formed by each mirror surface 37 and the optical axis 14 is 30° to 70°. This arrangement makes it possible to efficiently extract obliquely incident and narrowly distributed light from the inside of the light guide 15 by using the very simple structure of the light guide 15.

The incident angle of light exiting from the light guide 15 to the inspection target 23 on the surface of the inspection target 23 is 60° to 80°. This arrangement makes it possible to irradiate the inspection target 23 with obliquely incident and narrowly distributed light while preventing the inspection target 23 from being irradiated with specular reflected light components as noise. This can implement accurate inspection of the inspection target 23.

The optical inspection apparatus 11 includes the cover 18 that covers the outside of the light guide 15. This arrangement can prevent external light from entering the light guide 15. With this arrangement, the external light is transmitted through the light guide 15 to irradiate the inspection target 23, thereby preventing the light from appearing as noise in an image obtained by the imaging optical system 12. This makes it possible to perform accurate inspection of the inspection target 23.

The optical axis 14 of the imaging optical system 12 extends through the hollow region 15A inside the light guide 15. This arrangement allows the imaging optical system 12 to be arranged in an installation space of the light guide 15, and hence can downsize the optical inspection apparatus 11.

The plurality of light sources 13 are provided around the imaging optical system 12. This arrangement allows heat-generating components to be gathered around the imaging optical system 12. This can prevent the inspection target 23 from being adversely affected by heat. In addition, even when a cooling unit such as the heat sink 17 is arranged to cool the imaging optical system 12 and the plurality of light sources 13, it is possible to collectively and efficiently cool them by using one cooling unit.

The optical inspection apparatus 11 includes the heat sink 17 thermally connected to the plurality of light sources 13. This arrangement can improve the heat dissipation performance of the plurality of light sources 13, and hence can improve the reliability of the optical inspection apparatus 11.

The second to fourth embodiments and a comparative example will be described, mainly focusing on differences from the first embodiment, with illustrations and descriptions of common portions being omitted.

Second Embodiment

Figure 5:
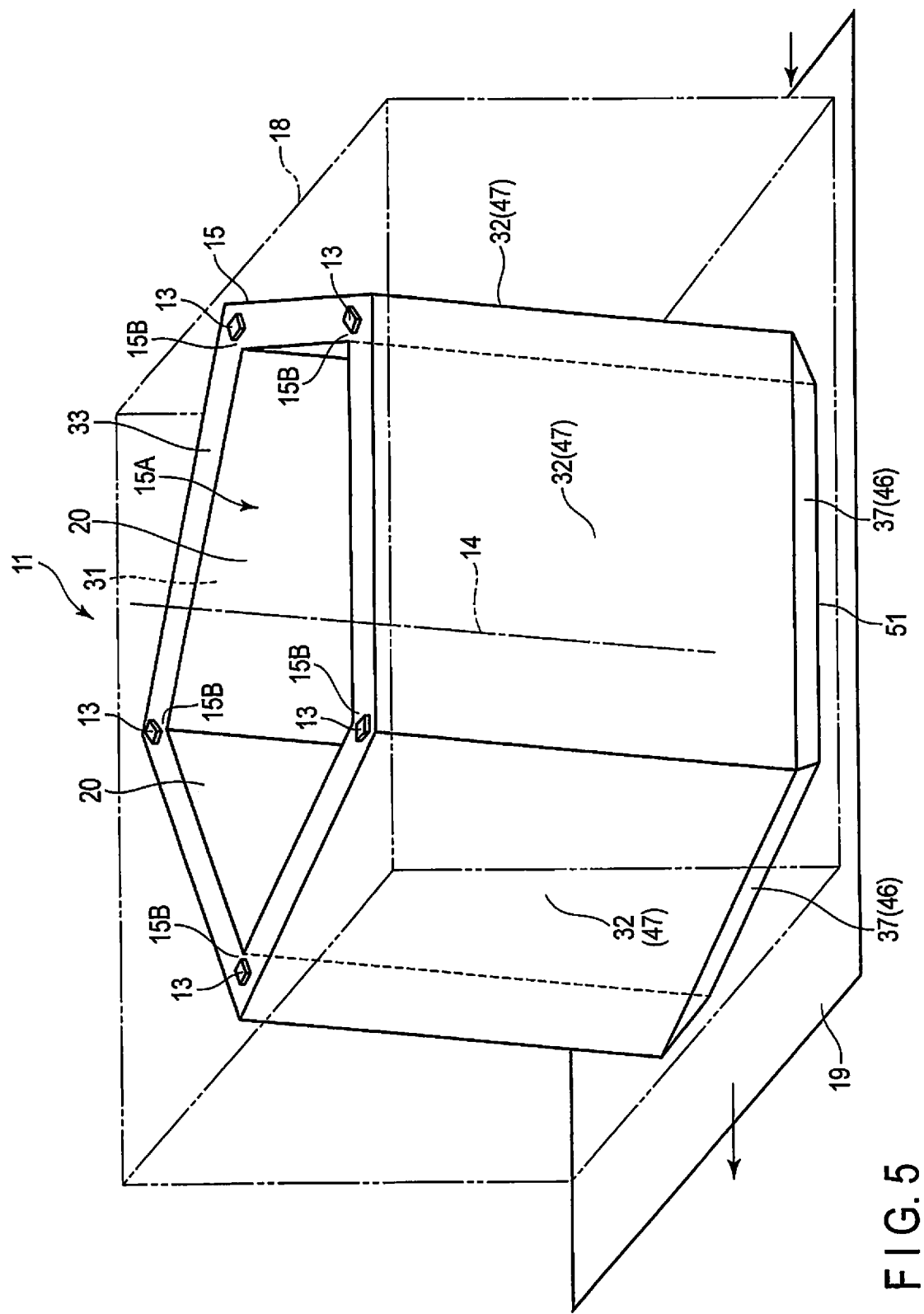
FIG. 5 is a perspective view showing part of an optical inspection apparatus according to a second embodiment.

An optical inspection apparatus 11 according to the second embodiment will be described with reference to FIGS. 5 and 6. In this embodiment, the form of a light guide 15 (light-shielding plates 20) and the number of light sources 13 differ from those in the first embodiment, but other portions are common to the first embodiment.

The light guide 15 is formed from a translucent material so as to have a hollow pentagonal cylindrical shape. The light guide 15 is formed into an equilateral pentagon when viewed from a distal point on an optical axis 14. The shape of the light guide 15 is not limited to an equilateral pentagon and may be a pentagon having sides with different lengths.

The light guide 15 includes the five inner surfaces 31 (inner peripheral surfaces), the five outer surfaces 32 (outer peripheral surfaces), the first end face 33 (incident surface) alongside the imaging optical system 12, and the five chamfers 46 (second end faces) facing the first end face 33. The five light-shielding plates 20 partially cover five total reflecting surfaces 35 of the light guide 15.

The plurality of light sources 13 (five light sources 13) are provided at five positions corresponding to corner portions 15B of the cylindrical light guide 15. The central axis of the light guide 15 coincides with the optical axis 14 of an imaging optical system 12. The light guide 15 internally has a sufficiently large hollow region 15A. Accordingly, the inner surfaces of the light guide 15 are configured so as not to enter a visual field range 28 of the imaging optical system 12. In this embodiment, this ensures a wide viewing angle for the imaging optical system 12. The plurality of light sources 13 are respectively provided at azimuth angles of 0°, 72°, 144°, 216°, and 288° when viewed from the optical axis 14.

The light guide 15 may be made of any material that is transparent to light. For example, a translucent resin material such as an acrylic resin can be suitably used for the light guide 15, but the material of the light guide 15 is not limited to this. The material of the light guide 15 may be polycarbonate, glass, or the like. Mirror surfaces 37 formed in the same manner as in the first embodiment can reflect light entered into the light guide 15 from the light sources 13 toward an inspection target 23.

The function of the optical inspection apparatus 11 of the second embodiment will be described with reference to FIGS. 5 and 6. The light that has entered the light guide 15 from one or more light sources 13 is totally internally reflected by the total reflecting surfaces 35 and also totally internally reflected by second total reflecting surfaces 47. The light may be totally internally reflected by these surfaces a plurality of times. The light totally internally reflected by the total reflecting surfaces 35 reaches the mirror surfaces 37 and is reflected toward the inspection target 23 by the mirror surfaces 37. The light reflected by the mirror surfaces 37 is refracted by transmission surfaces 36 and transmitted to the inspection target 23. The imaging optical system 12 can thus detect the light (scattered light) applied to the inspection target 23 and reflected by the inspection target 23 to capture an image of the inspection target 23.

Figure 6:
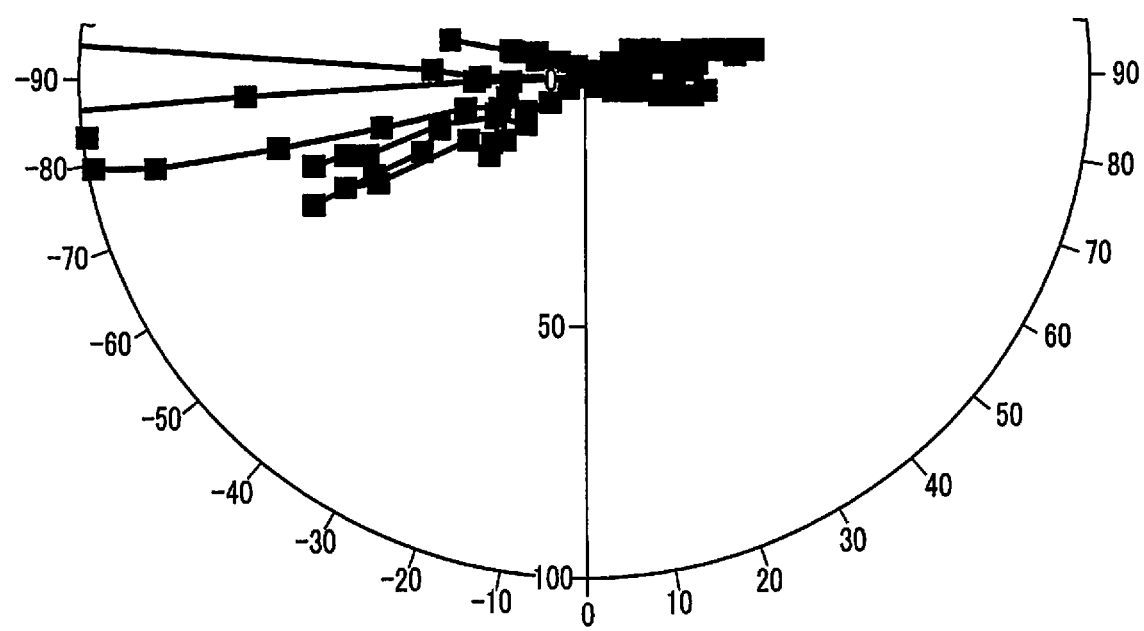
FIG. 6 is a view showing a light distribution (incident angle distribution) at an azimuth angle of 0° based on the light tracking simulation result of light beams emitted from light sources in the optical inspection apparatus shown in FIG. 5 when an angle φ formed by a mirror surface (chamfer) and an optical axis (inner surface) is set to 50°.

FIG. 6 shows a light distribution (an incident angle distribution on the surface of the inspection target 23) calculated by using light tracking simulation. The simulation result shown in FIG. 6 indicates that the incident angle θ of light entering the surface of the inspection target 23 was actually distributed in the range of 60° to 85° (−60° to −85°). This tendency did not greatly change regardless of azimuth angles of observation centered on the inspection target 23. The light distribution (incident angle distribution) simulation result was obtained at azimuth angles of 0°, 30°, 45°, 60°, 90°, 120°, 135°, and 150°. Note that FIG. 6 corresponds to a light distribution (incident angle distribution) at an azimuth angle of 0° when the angle φ formed by the mirror surface 37 (chamfered surface 46) and the optical axis 14 (inner surface 31) is set to 50°. In addition, because the light guide 15 according to this embodiment was pentagonal, the light distribution (incident angle distribution) was not bilaterally symmetric.

This simulation result indicates that the angle width of incident angles was about 25°. This enables to understand that this embodiment implemented a sufficiently narrow light distribution. The imaging optical system 12 can obtain an image of the inspection target 23 by irradiating the inspection target 23 with light in this manner and detecting light (scattered light) reflected by the inspection target 23. In this case, the incident angle of light on the surface of the inspection target 23 falls within the range of 60° to 85° (−60° to −85°), and the inspection target 23 can be irradiated with narrowly distributed and obliquely incident light. This makes it possible to extract a large amount of obliquely incident light that is effective as inspection light while minimizing specular reflected light components as noise. This implements accurate inspection of the edges of the surface shape of the inspection target 23. With the minimum number of light sources 13, it is also possible to obtain light with sufficient intensity.

According to the second embodiment, the optical inspection apparatus 11 that can perform accurate inspection and can reduce the number of light sources 13 is provided.

Third Embodiment

An optical inspection apparatus 11 according to the third embodiment will be described with reference to FIGS. 7 and 8. In this embodiment, the form of a light guide 15 (light-shielding plates 20) and the number of light sources 13 differ from those in the first embodiment, but other portions are common to the first embodiment.

The light guide 15 is formed from a translucent material so as to have a hollow hexagonal cylindrical shape. The light guide 15 is formed into an equilateral hexagon when viewed from a distal point on an optical axis 14. The shape of the light guide 15 is not limited to an equilateral hexagon and may be a hexagon having sides with different lengths.

The light guide 15 includes the six inner surfaces 31 (inner peripheral surfaces), the six outer surfaces 32 (outer peripheral surfaces), the first end face 33 (incident surface) alongside the imaging optical system 12, and the six chamfers 46 (second end faces) facing the first end face 33. The six light-shielding plates 20 partially cover six total reflecting surfaces 35 of the light guide 15.

A plurality of light sources 13 (six light sources 13) are provided at six positions corresponding to corner portions 15B of the cylindrical light guide 15. The central axis of the light guide 15 coincides with the optical axis 14 of an imaging optical system 12. The light guide 15 internally has a sufficiently large hollow region 15A. Accordingly, the inner surfaces of the light guide 15 are configured so as not to enter a visual field range 28 of the imaging optical system 12. In this embodiment, this ensures a wide viewing angle for the imaging optical system 12. The plurality of light sources 13 are respectively provided at azimuth angles of 0°, 60°, 120°, 180°, 240°, and 300° when viewed from the optical axis 14.

The light guide 15 may be made of any material that is transparent to light. For example, a translucent resin material such as an acrylic resin can be suitably used for the light guide 15, but the material of the light guide 15 is not limited to this. The material of the light guide 15 may be polycarbonate, glass, or the like. Mirror surfaces 37 formed in the same manner as in the first embodiment can reflect light entered into the light guide 15 from the light sources 13 toward an inspection target 23.

The function of the optical inspection apparatus 11 of the third embodiment will be described with reference to FIGS. 7 and 8. The light that has entered the light guide 15 from the light sources 13 is totally internally reflected by the total reflecting surfaces 35 and also totally internally reflected by second total reflecting surfaces 47. The light may be totally internally reflected by these surfaces a plurality of times. The light totally internally reflected by the total reflecting surfaces 35 reaches the mirror surfaces 37 and is reflected toward the inspection target 23 by the mirror surfaces 37. The light reflected by the mirror surfaces 37 is refracted by transmission surfaces 36 and transmitted to the inspection target 23. The imaging optical system 12 can thus detect the light (scattered light) applied to the inspection target 23 and reflected by the inspection target 23 to capture an image of the inspection target 23.

Figure 8:
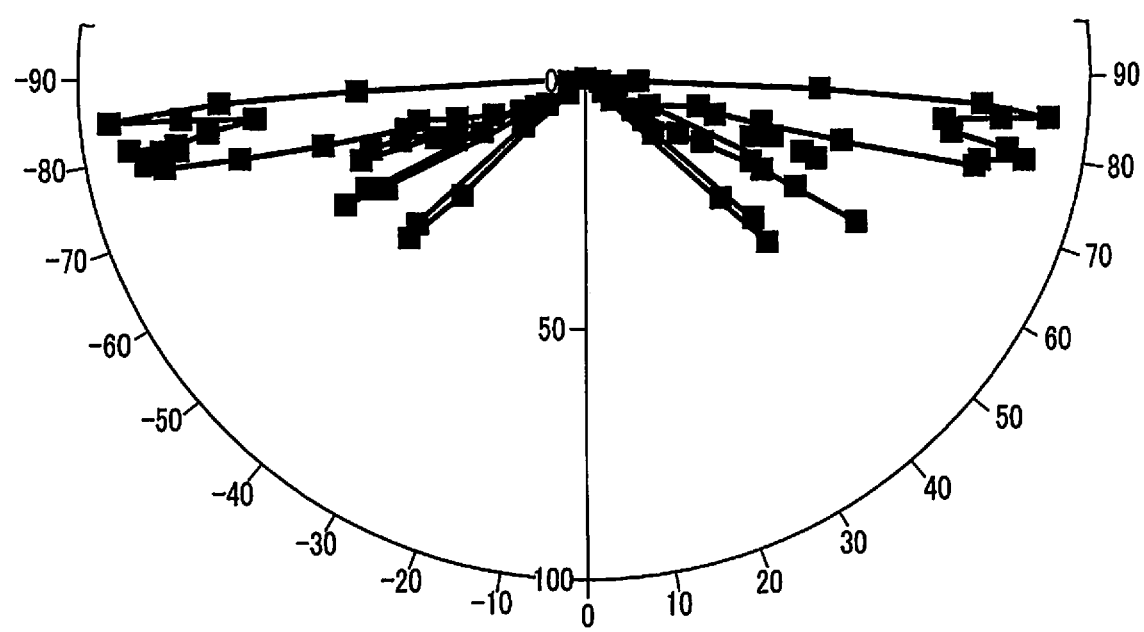
FIG. 8 is a view showing a light distribution (incident angle distribution) at an azimuth angle of 30° based on the light tracking simulation result of light beams emitted from light sources in the optical inspection apparatus shown in FIG. 7 when an angle φ formed by a mirror surface (chamfer) and an optical axis (inner surface) is set to 50°.

FIG. 8 shows a light distribution (an incident angle distribution on the surface of the inspection target 23) calculated by using light tracking simulation. The simulation result shown in FIG. 8 indicates that the incident angle θ of light entering the surface of the inspection target 23 was actually distributed in the range of 50° to 85° (−50° to −85°). This tendency did not greatly change regardless of azimuth angles of observation centered on the inspection target 23. The light distribution (incident angle distribution) simulation result was obtained at azimuth angles of 0°, 30°, 45°, 60°, 90°, 120°, 135°, and 150°. Note that FIG. 8 corresponds to a light distribution (incident angle distribution) at an azimuth angle of 30° when the angle φ formed by the mirror surface 37 (chamfered surface 46) and the optical axis 14 (inner surface 31) is set to 50°.

This simulation result indicates that the angle width of incident angles was about 35°. Although the angle width in this embodiment was larger than that in the first and second embodiments, it can be understood that the inspection target was irradiated with narrowly-distributed and obliquely incident light. The imaging optical system 12 can obtain an image of the inspection target 23 by irradiating the inspection target 23 with light in this manner and detecting light (scattered light) reflected by the inspection target 23. In this case, the incident angle of light on the surface of the inspection target 23 falls within the range of 50° to 85° (−50° to −85°), and the inspection target 23 can be irradiated with narrowly distributed and obliquely incident light. This makes it possible to extract a large amount of obliquely incident light that is effective as inspection light while minimizing specular reflected light components as noise. This implements accurate inspection of the edges of the surface shape of the inspection target 23. With the minimum number of light sources 13, it is also possible to obtain light with sufficient intensity.

According to the third embodiment, the optical inspection apparatus 11 that can perform accurate inspection and can reduce the number of light sources 13 is provided.

Fourth Embodiment

Figure 9:
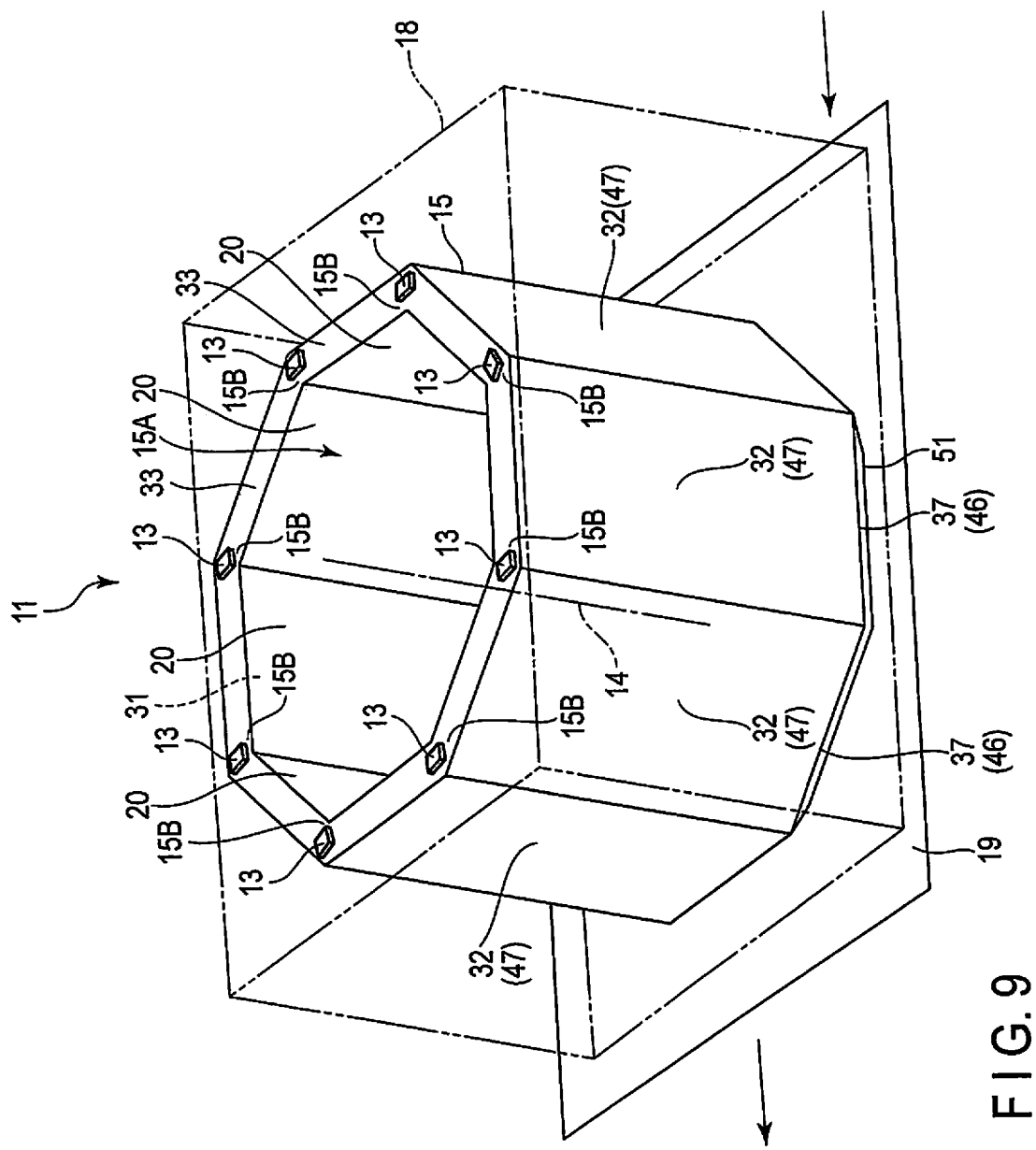
FIG. 9 is a perspective view showing part of an optical inspection apparatus according to a fourth embodiment.

An optical inspection apparatus 11 according to the fourth embodiment will be described with reference to FIGS. 9 and 10. In this embodiment, the form of a light guide 15 (light-shielding plates 20) and the number of light sources 13 differ from those in the first embodiment, but other portions are common to the first embodiment.

The light guide 15 is formed from a translucent material so as to have a hollow octagonal cylindrical shape. The light guide 15 is formed into an equilateral octagon when viewed from a distal point on an optical axis 14. The shape of the light guide 15 is not limited to an equilateral octagon and may be an octagon having sides with different lengths.

The light guide 15 includes the eight inner surfaces 31 (inner peripheral surfaces), the eight outer surfaces 32 (outer peripheral surfaces), the first end face 33 (incident surface) alongside the imaging optical system 12, and the eight chamfers 46 (second end faces) facing the first end face 33. The eight light-shielding plates 20 partially cover eight total reflecting surfaces 35 of the light guide 15.

The plurality of light sources 13 (eight light sources 13) are provided at eight positions corresponding to corner portions 15B of the cylindrical light guide 15. The central axis of the light guide 15 coincides with the optical axis 14 of an imaging optical system 12. The light guide 15 internally has a sufficiently large hollow region 15A. Accordingly, the inner surfaces of the light guide 15 are configured so as not to enter a visual field range 28 of the imaging optical system 12. In this embodiment, this ensures a wide viewing angle for the imaging optical system 12. The plurality of light sources 13 are respectively provided at azimuth angles of 0°, 45°, 90°, 135°, 180°, 225°, 270°, and 315° when viewed from the optical axis 14.

The light guide 15 may be made of any material that is transparent to light. For example, a translucent resin material such as an acrylic resin can be suitably used for the light guide 15, but the material of the light guide 15 is not limited to this. The material of the light guide 15 may be polycarbonate, glass, or the like. Mirror surfaces 37 formed in the same manner as in the first embodiment can reflect light entered into the light guide 15 from the light sources 13 toward an inspection target 23.

The function of the optical inspection apparatus 11 of this embodiment will be described with reference to FIGS. 9 and 10. The light that has entered the light guide 15 from one or more light sources 13 is totally internally reflected by the total reflecting surfaces 35 and also totally internally reflected by second total reflecting surfaces 47. The light may be totally internally reflected by these surfaces a plurality of times. The light totally internally reflected by the total reflecting surfaces 35 reaches the mirror surfaces 37 and is reflected toward the inspection target 23 by the mirror surfaces 37. The light reflected by the mirror surfaces 37 is refracted by transmission surfaces 36 and transmitted to the inspection target 23. The imaging optical system 12 can thus detect the light (scattered light) applied to the inspection target 23 and reflected by the inspection target 23 to capture an image of the inspection target 23.

Figure 10:
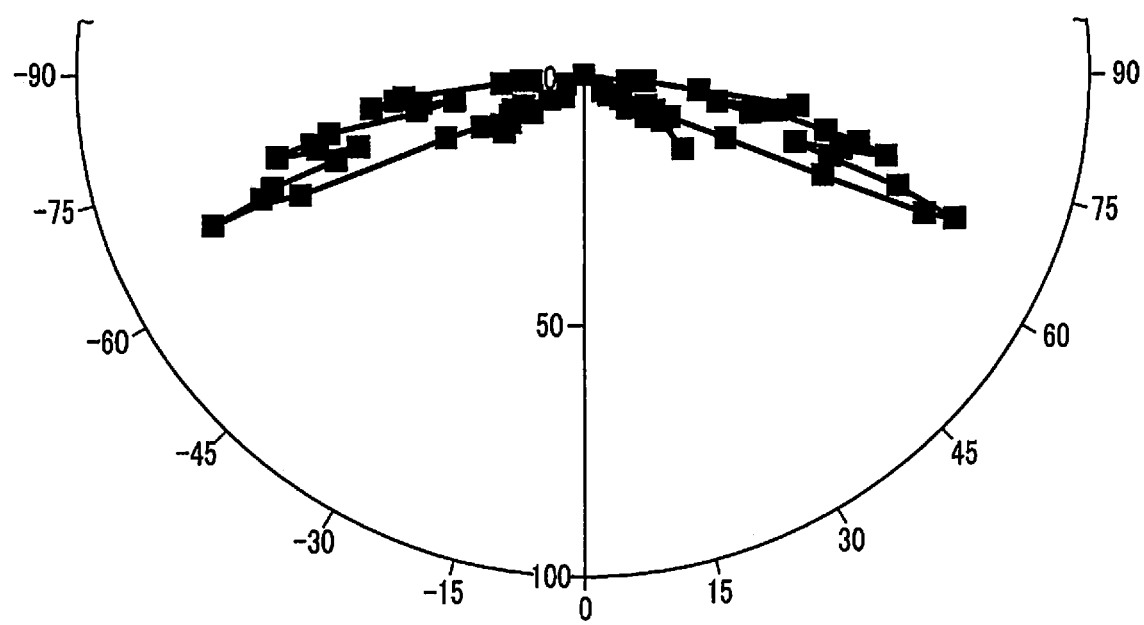
FIG. 10 is a view showing a light distribution (incident angle distribution) at an azimuth angle of 0° based on the light tracking simulation result of light beams emitted from light sources in the optical inspection apparatus shown in FIG. 9 when an angle φ formed by a mirror surface (chamfer) and an optical axis (inner surface) is set to 50°.

FIG. 10 shows a light distribution (an incident angle distribution on the surface of the inspection target 23) calculated by using light tracking simulation. The simulation result shown in FIG. 10 indicates that the incident angle θ of light entering the surface of the inspection target 23 was actually distributed in the range of 50° to 85° (−50° to −85°). This tendency did not greatly change regardless of azimuth angles of observation centered on the inspection target 23. The light distribution (incident angle distribution) simulation result was obtained at azimuth angles of, for example, 0°, 30°, 45°, 60°, 90°, 120°, 135°, and 150°. Note that FIG. 10 corresponds to a light distribution (incident angle distribution) at an azimuth angle of 0° when the angle φ formed by the mirror surface 37 (chamfered surface 46) and the optical axis 14 (inner surface 31) is set to 50°.

This simulation result indicates that the angle width of incident angles was about 35°. Although the angle width in this embodiment was larger than that in the first and second embodiments, it can be understood that the inspection target was irradiated with narrowly-distributed and obliquely incident light. The imaging optical system 12 can obtain an image of the inspection target 23 by irradiating the inspection target 23 with light in this manner and detecting light (scattered light) reflected by the inspection target 23. In this case, the incident angle of light on the surface of the inspection target 23 falls within the range of 50° to 85° (−50° to −85°), and the inspection target 23 can be irradiated with narrowly distributed and obliquely incident light. This makes it possible to extract a large amount of obliquely incident light that is effective as inspection light while minimizing specular reflected light components as noise. This implements accurate inspection of the edges of the surface shape of the inspection target 23. With the minimum number of light sources 13, it is also possible to obtain light with sufficient intensity.

According to the fourth embodiment, the optical inspection apparatus 11 that can perform accurate inspection and can reduce the number of light sources 13 is provided.

Comparative Example

Figure 11:
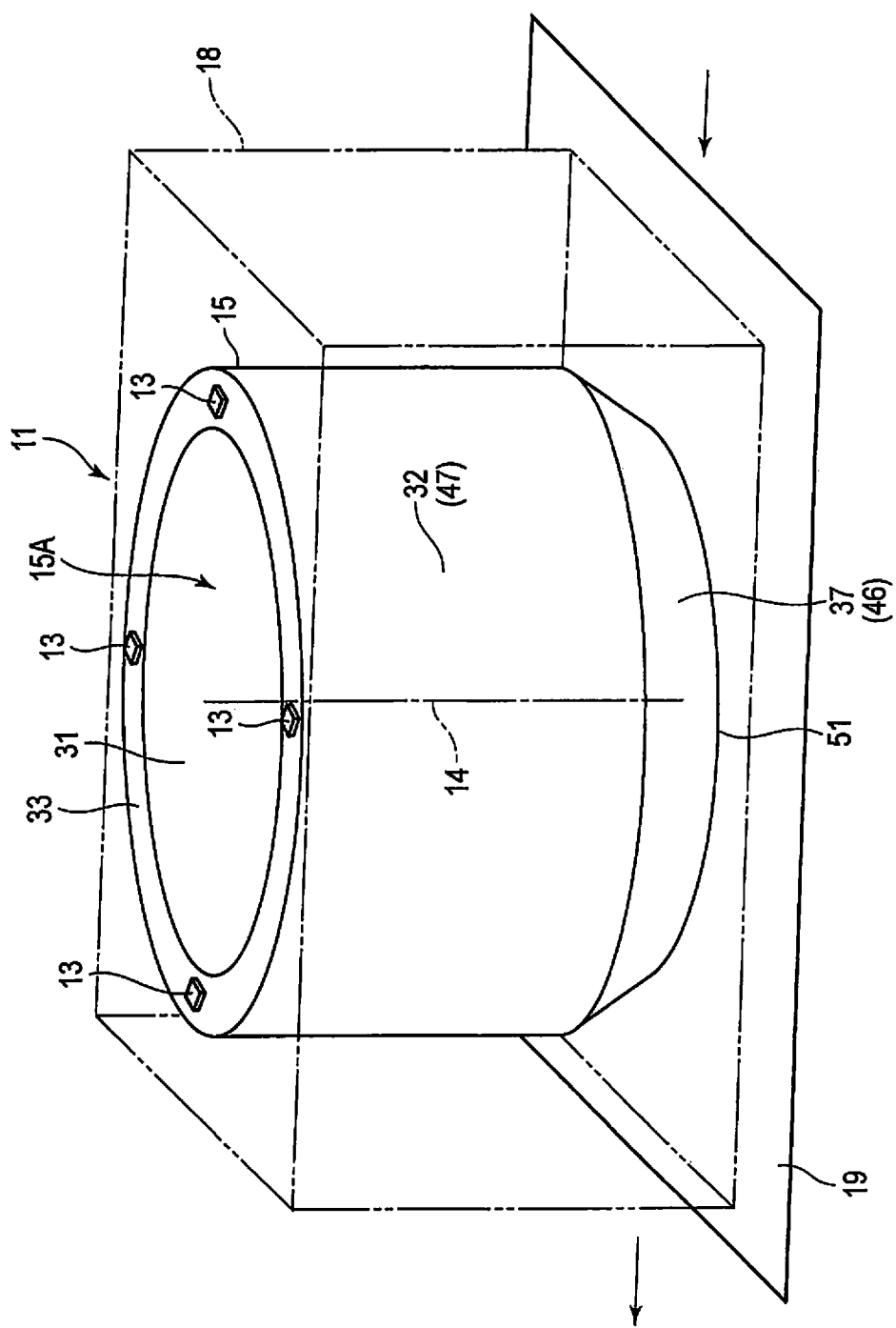
FIG. 11 is a perspective view showing part of an optical inspection apparatus according to a comparative example.

An optical inspection apparatus 11 according to a comparative example will be described with reference to FIGS. 11, 12 and 13. In this embodiment, the form of a light guide 15 and the number of light sources 13 differ from those in the first embodiment, but other portions are common to the first embodiment.

The light guide 15 is formed from a translucent material so as to have a hollow cylindrical shape. The light guide 15 has the same arrangement as that in the first embodiment except that the light guide 15 is formed into a cylindrical shape. The light guide 15 includes the inner surface 31 (inner peripheral surface), the outer surface 32 (outer peripheral surface), the first end face 33 (incident surface) alongside the imaging optical system 12, and the chamfer 46 (second end face) facing the first end face 33.

The plurality of light sources 13 (four light sources 13) are provided at four positions spaced apart from each other at equal intervals so as to face end face 33 of the light guide 15. The central axis of the light guide 15 coincides with the optical axis 14 of the imaging optical system 12. The plurality of light sources 13 are provided at azimuth angles of 0°, 90°, 180°, and 270° when viewed from the optical axis 14. The light guide 15 internally has a sufficiently large hollow region 15A.

The light guide 15 may be made of any material that is transparent to light. For example, a translucent resin material such as an acrylic resin can be used for the light guide 15. The mirror surface 37 formed in the same manner as in the first embodiment can reflect light entered into the light guide 15 from the light sources 13 toward the inspection target 23.

The function of the optical inspection apparatus 11 of according to the comparative example will be described with reference to FIGS. 11, 12 and 13. The light that has entered the light guide 15 from one or more light sources 13 is totally internally reflected by the total reflecting surface 35 and also totally internally reflected by second total reflecting surface 47. The light may be totally internally reflected by these surfaces a plurality of times. The light totally internally reflected by the total reflecting surface 35 reaches the mirror surface 37 and is reflected toward the inspection target 23 by the mirror surface 37. The light reflected by the mirror surface 37 is refracted by transmission surface 36 and transmitted to the inspection target 23. The imaging optical system 12 can thus detect the light (scattered light) applied to the inspection target 23 and reflected by the inspection target 23 to capture an image of the inspection target 23.

Figure 12:
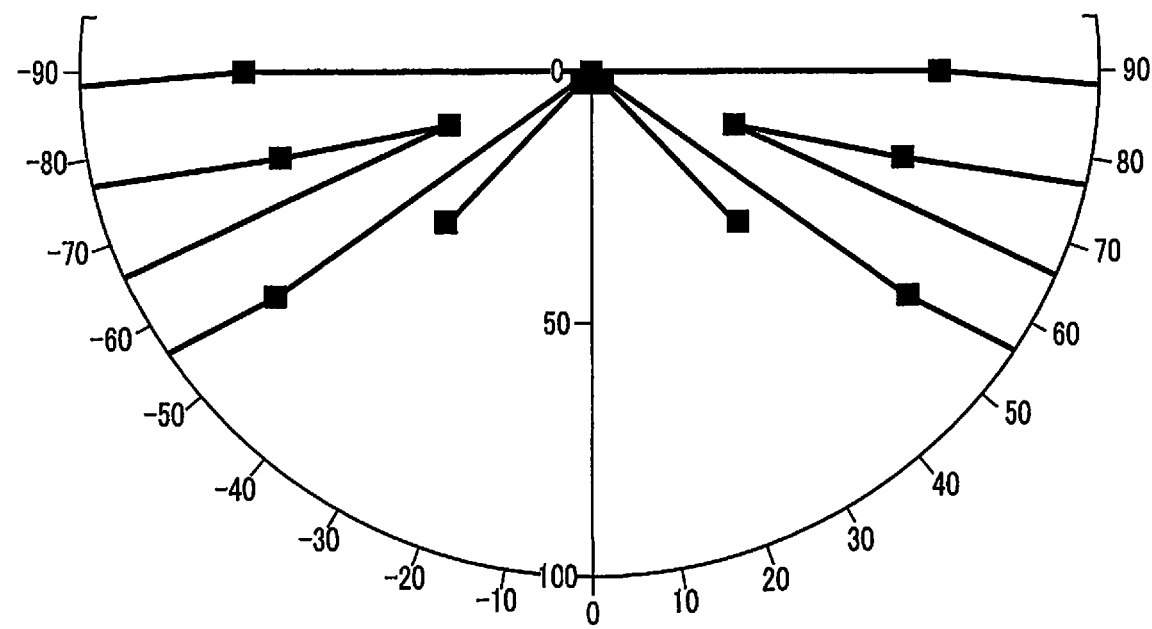
FIG. 12 is a view showing a light distribution (incident angle distribution) at an azimuth angle of 0° based on the light tracking simulation result of light beams emitted from light sources in the optical inspection apparatus shown in FIG. 11 when an angle φ formed by a mirror surface (chamfer) and an optical axis (inner surface) is set to 50°.
Figure 13:
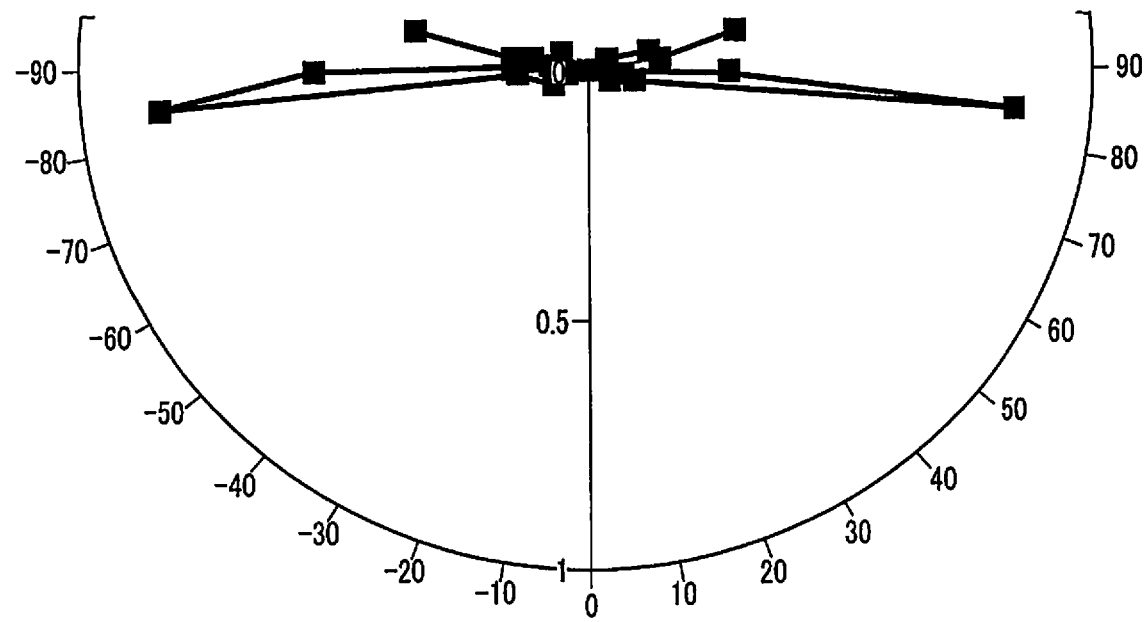
FIG. 13 is a view showing a light distribution (incident angle distribution) at an azimuth angle of 30° based on the light tracking simulation result of light beams emitted from light sources in the optical inspection apparatus shown in FIG. 11 when an angle φ formed by a mirror surface (chamfer) and an optical axis (inner surface) is set to 50°.

FIGS. 12 and 13 show a light distribution (an incident angle distribution on the surface of the inspection target 23) calculated by using light tracking simulation. The simulation result shown in FIG. 12 indicates that an incident angle θ of light entering the surface of the inspection target 23 was actually distributed in the range of 45° to 90° (−45° to −90°). As in this case, the tendency in which light obliquely entering the inspection target 23 does not become narrowly-distributed light remains the same at any azimuth angle of observation centered on the inspection target 23. The light distribution (incident angle distribution) simulation result was obtained at azimuth angles of, for example, 0°, 30°, 45°, 60°, 90°, 120°, 135°, and 150°. Note that FIG. 12 corresponds to a light distribution (incident angle distribution) at an azimuth angle of 0° when the angle φ formed by the mirror surface 37 (chamfered surface 46) and the optical axis 14 (inner surface 31) is set to 50°. FIG. 13 corresponds to a light distribution (incident angle distribution) at an azimuth angle of 30° when the angle φ formed by the mirror surface 37 (chamfer 46) and the optical axis 14 (inner surface 31) is set to 50°.

The simulation result indicates that only when the light sources 13 were arranged at azimuth angles of 0°, 90°, 180°, and 270°, oblique incident light with high intensity was obtained as shown in FIG. 12. In the case shown in FIG. 12, the angle width of incident angles was about 45°. In contrast to this, if the positions of the light sources 13 are shifted, even slightly, from the arranged azimuth angles, for example, the intensity of light at an azimuth angle of 30° shown in FIG. 13 is 1/100 of the intensity at an azimuth angle of 0°. That is, the intensity of light is not sufficient. In addition, even in the light distribution (incident angle distribution), desired obliquely incident light was not able to be obtained and light often entered the inspection target 23 in the range of angles of ±90° or more. This indicates that the optical inspection apparatus 11 according to the comparative example was not able to implement accurate inspection of the inspection target 23.

As described above, according to the first to fourth embodiments and the comparative example, as the number of corners of a polygon increased, the angle width of distribution angles (incident angles) of light irradiating the inspection target 23 increased, and the amount of specular reflected light components gradually increased as well as the amount of obliquely incident light. It was also found that as the light guide 15 was formed into a perfect cylindrical shape, the intensity of light varied depending on the azimuth angle. As described above, as the number of corners of the polygonal shape of the light guide 15 increased, the form of the light guide 15 gradually approached a circular cylindrical shape. It was therefore found that increasing the number of corners of a polygon would gradually reduce the advantage obtained by forming the light guide 15 into a polygonal cylindrical shape and arranging the light sources 13 at positions corresponding to the corner portions 15B. In addition, this would increase the number of light sources 13 and hence increase the manufacturing cost of the optical inspection apparatus 11. Accordingly, the light guide 15 preferably has a polygonal cylindrical shape with four or more corners and eight or less corners. That is, the light guide 15 preferably has a polygonal cylinder that is square, pentagonal, hexagonal, heptagonal or octagonal. The light guide 15 may have a triangular cylindrical shape.

According to the first to fourth embodiments, the optical inspection apparatus 11 that can perform accurate inspection and can reduce the number of light sources 13 is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection apparatus comprising:
an imaging optical system facing an inspection target;
a light guide having a polygonal cylindrical shape with a plurality of corner portions extending along an optical axis of the imaging optical system and including a first end face and a plurality of second end faces, each of the second end faces facing the first end face;
a plurality of light sources facing the first end face of the light guide at positions corresponding to the plurality of corner portions; and
mirror surfaces respectively provided on the second end faces of the light guide, each of the mirror surfaces being oblique relative to the optical axis and configured to reflect light entered into the light guide from the light sources toward the inspection target.

2. The apparatus of claim 1, wherein:
the light guide includes inner surfaces, and
each of the mirror surfaces is inclined so as to approach the adjacent inner surface of the light guide to the optical axis with an increase in distance with respect to the first end face.

3. The apparatus of claim 1, wherein:
the light guide includes inner surfaces and transmission surfaces provided on the inner surfaces of the light guide at a position facing the mirror surfaces; and
the apparatus further comprises light-shielding plates covering the inner surfaces of the light guide at a position out of the transmission surfaces.

4. The apparatus of claim 1, wherein:
each of the second end faces of the light guide includes a chamfer formed by chamfering so as to remove an imaginary ridge line located at an intersection position between a first end portion of the light guide which is located alongside the inspection target and an outer surface of the light guide, and
each of the mirror surfaces is formed on the chamfer.

5. The apparatus of claim 1, wherein an angle formed by each of the mirror surfaces and the optical axis is 30° to 70°.

6. The apparatus of claim 1, wherein an incident angle of light emitted from the light guide to the inspection target on a surface of the inspection target is 60° to 80° with respect to the optical axis of the imaging optical system.

7. The apparatus of claim 1, further comprising a cover covering an outside of the light guide.

8. The apparatus of claim 1, wherein the optical axis of the imaging optical system extends through a hollow region inside the light guide.

9. The apparatus of claim 1, wherein the light guide has a polygonal cylinder that is square, pentagonal, hexagonal, heptagonal or octagonal.

10. The apparatus of claim 1, wherein the plurality of light sources are provided around the imaging optical system.

11. The apparatus of claim 1, further comprising a heat sink thermally connected to the plurality of light sources.

* * * * *